US012755345B2

(12) United States Patent
Lungu-Stan et al.

(10) Patent No.: US 12,755,345 B2
(45) Date of Patent: Oct. 6, 2026

(54) TEXTURE BASED CONSISTENCY FOR GENERATIVE AI ASSETS, EFFECTS AND ANIMATIONS

(71) Applicant: ADOBE INC., San Jose, CA (US)

(72) Inventors: Vlad-Constantin Lungu-Stan, Bucharest (RO); Adrian-Stefan Ungureanu-Contes, Bucharest (RO); Ionuţ Mironică, Bucharest (RO)

(73) Assignee: ADOBE INC., San Jose, CA (US)

( * ) Notice: Subject to any disclaimer, the term of this patent is extended or adjusted under 35 U.S.C. 154(b) by 151 days.

(21) Appl. No.: 18/665,130

(22) Filed: May 15, 2024

(65) Prior Publication Data

US 2025/0322495 A1 Oct. 16, 2025

(51) Int. Cl.

| | |
|---|---|
| ***G06T 11/00*** | (2026.01) |
| ***G06T 5/50*** | (2006.01) |
| ***G06T 7/40*** | (2017.01) |
| ***G06T 13/80*** | (2011.01) |

(52) U.S. Cl.
CPC .................. *G06T 5/50* (2013.01); *G06T 7/40* (2013.01); *G06T 13/80* (2013.01); *G06T 2207/20221* (2013.01)

(58) Field of Classification Search
CPC ................................. G06T 7/40; G06T 11/00
USPC ......................................................... 345/629
See application file for complete search history.

(56) References Cited

U.S. PATENT DOCUMENTS

| | | | | |
|---|---|---|---|---|
| 11,126,788 | B2 * | 9/2021 | Fisher | G06F 40/16 |
| 2023/0274492 | A1 * | 8/2023 | Chen | G06T 17/00 345/419 |
| 2024/0069432 | A1 * | 2/2024 | Wei | G06T 7/0004 |
| 2025/0166237 | A1 * | 5/2025 | Zeng | G06T 7/70 |
| 2025/0265717 | A1 * | 8/2025 | Janisch | G06T 7/187 |
| 2025/0278876 | A1 * | 9/2025 | Day | G06T 7/50 |

OTHER PUBLICATIONS

Rombach, et al., "High-Resolution Image Synthesis with Latent Diffusion Models", in Computer Vision and Pattern Recognition, 2022, pp. 10684-10695.
Meng, et al., "SDEdit: Guided Image Synthesis and Editing with Stochastic Differential Equations", in Computer Vision and Pattern Recognition, arXiv preprint arXiv:2108.01073v2 [cs.CV] Jan. 5, 2022, pp. 1-33.
Zhang, et al., "Adding Conditional Control to Text-to-Image Diffusion Models", in ICCV Open Access Paper, 2023, pp. 3836-3847.
Achanta, et al., "SLIC Superpixels Compared to State-of-the-Art Superpixel Methods", IEEE Transactions on Pattern Analysis and Machine Intelligence, vol. 34, 2012, pp. 2274-2282.

* cited by examiner

*Primary Examiner* — Samantha (Yuehan) Wang
(74) *Attorney, Agent, or Firm* — F. CHAU & ASSOCIATES, LLC

(57) ABSTRACT

A method, apparatus, non-transitory computer readable medium, and system for image processing include obtaining an input texture image and a plurality of image masks, generating a plurality of image assets corresponding to the plurality of image masks based on the input texture image, and generating a combined asset including the plurality of image assets. The plurality of image assets have a consistent texture based on the input texture image.

20 Claims, 11 Drawing Sheets

TEXTURE BASED CONSISTENCY FOR GENERATIVE AI ASSETS, EFFECTS AND ANIMATIONS

BACKGROUND

The following relates generally to image processing, and more specifically to the generation of consistent visual effects and assets using generative AI models. In the field of content creation, visual effects can enhance the quality of results and shape the user experience. These effects can be either static, such as visual embellishments added to images and designs, or dynamic, such as iteratively changing frames. Both static and dynamic effects can be applied to various design assets, including fonts, characters, and standalone elements.

Image generation models, including diffusion models, are machine learning techniques that learn from large datasets of existing images to generate new, visually similar images based on input prompts or conditions, and have shown promising results in creating high-quality and diverse visual content.

SUMMARY

A method, apparatus, and non-transitory computer readable medium for visual effects generation are described. One or more aspects of the method, apparatus, and non-transitory computer readable medium include obtaining an input texture image and a plurality of image masks, generating, using an image generation model, a plurality of image assets corresponding to the plurality of image masks based on the input texture image, and generating a combined asset including the plurality of image assets. The plurality of image assets have a consistent texture based on the input texture image.

A method, apparatus, and non-transitory computer readable medium for visual effects generation are described. One or more aspects of the method, apparatus, and non-transitory computer readable medium include obtaining an input texture image and an image mask; identifying a border region of the image mask; combining the input texture image with the image mask to obtain a intermediate texture image that include a texture from the input texture image in the border region; and generating, using the image generation model, an image asset corresponding to the image mask based on the texture image, wherein the texture image has a texture based on the input texture image in at least a portion of the border region.

An apparatus and method for visual effects generation are described. One or more aspects of the apparatus and method include at least one processor; at least one memory storing instruction executable by the at least one processor; and an image generation model comprising parameters stored in the at least one memory and trained to generate a plurality of image assets corresponding to a plurality of image masks based on a plurality of intermediate texture images, respectively, wherein the plurality of image assets have a consistent texture based on an input texture image, wherein the intermediate texture images are based on the input texture image and the plurality of texture masks.

DETAILED DESCRIPTION

Figure 1:
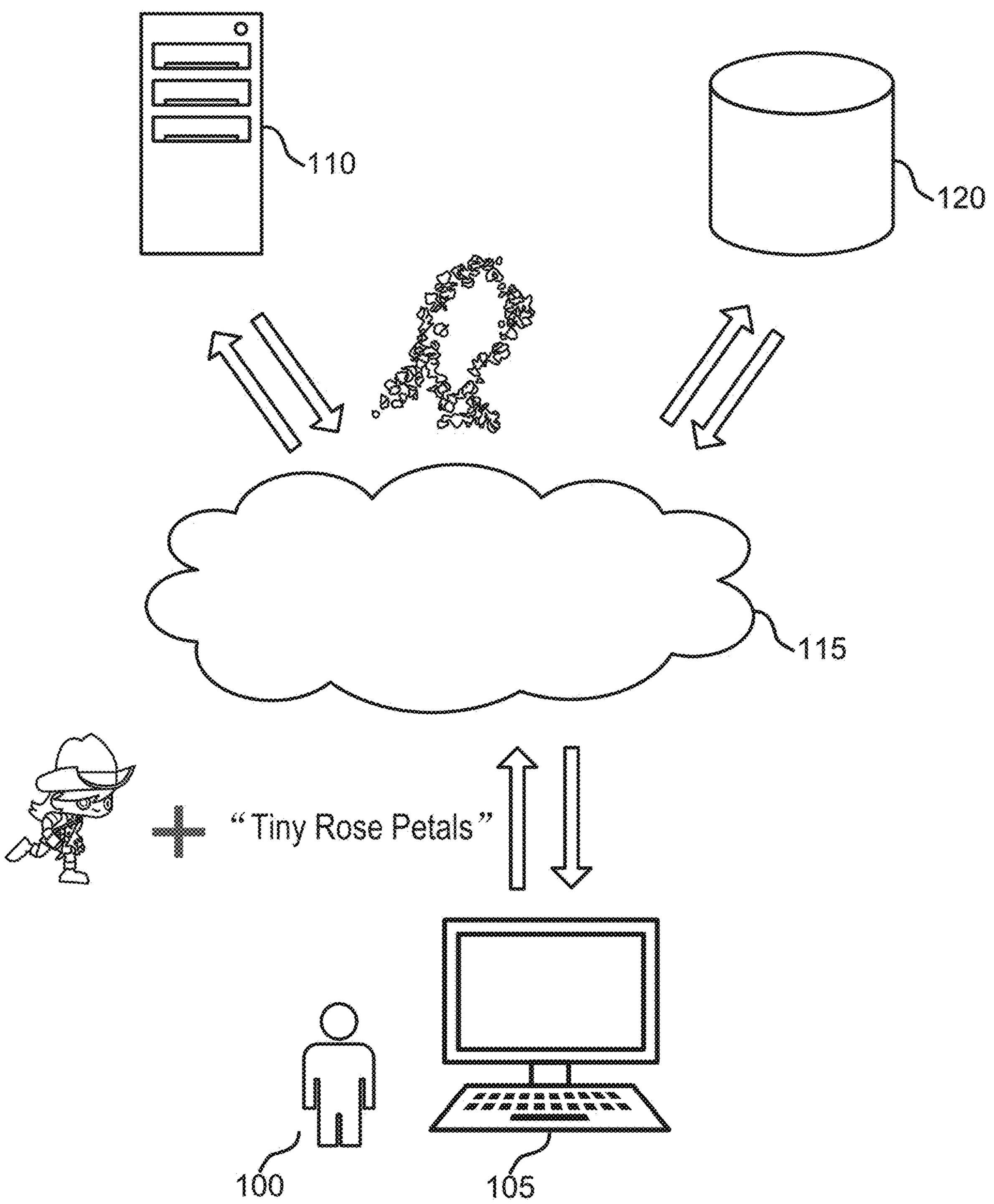
FIG. 1 shows an example of an image processing system according to aspects of the present disclosure.

In digital content creation, generating visually consistent and controllable effects and assets is a critical challenge that directly impacts the quality of the final output and the overall user experience. Visual effects, whether static or dynamic, serve as essential tools for enhancing the aesthetic appeal and immersion of digital content, ranging from simple embellishments to complex animations. However, creating these effects often requires a delicate balance between artistic expression and technical precision, as inconsistencies or lack of control can lead to visual dissonance and diminished quality.

Embodiments of the present disclosure provide a texture-centric generative AI algorithm that addresses the challenges of generating consistent and controllable visual effects, assets, and animations. By leveraging the power of generative AI models, particularly those based on diffusion techniques, the proposed approach offers a more intuitive and user-friendly way to create high-quality visual elements while maintaining coherence across multiple instances. The algorithm takes a texture element provided by the user as input and uses it as a starting point for generating consistent effects, allowing for fine-grained control over the style and form of the generated output.

Embodiments of the present disclosure improve the accuracy of image generation models for generating visual assets such as visual effects, glyphs, and animations. For example, an effect surrounding an animated figure can be generated such that frames of the animation have consistent but diverse textures. Some embodiments achieve this improved accuracy by obtaining a single texture image, and generating multiple consistent image assets using the texture image and different image masks. These image assets can then be aggregated to form a combined image asset with multiple frames or objects with variations of the texture.

Embodiments of the present disclosure use input texture image as a basis for the generated assets and maintaining consistency through the use of image masks and intermediate texture images. The proposed method involves obtaining an input texture image and a set of image masks, which are then combined to create intermediate texture images. These intermediate images are used as the foundation for generating image assets. The image assets inherit the consistent texture from the input texture image, resulting in visually consistent elements across the generated output.

Furthermore, the method includes the creation of a combined asset that incorporates the generated image assets, providing a streamlined approach to producing a wide range of coherent visual content. By automating the process and ensuring consistency through the use of shared textures and masks, the proposed method significantly reduces the time and effort required for manual adjustments and eliminates the need for complex mesh generation techniques.

Image Processing Method

Accordingly, the present disclosure includes the following aspects. A method for visual effects generation is described. One or more aspects of the method include obtaining an input texture image and a plurality of image masks; combining the input texture image with each of the plurality of image masks to obtain a plurality of intermediate texture images; and generating, using an image generation model, a plurality of image assets corresponding to the plurality of image masks based on the plurality of intermediate texture images, respectively, wherein the plurality of image assets have a consistent texture based on the input texture image.

Some examples of the method, apparatus, and non-transitory computer readable medium further include obtaining a text prompt. Some examples further include generating the texture image based on the text prompt. Some examples of the method, apparatus, and non-transitory computer readable medium further include obtaining a plurality of input images. Some examples further include generating the plurality of image masks based on the plurality of input images, respectively, wherein each of the plurality of image masks indicates a location of an element from a corresponding input image from the plurality of input images.

Some examples of the method, apparatus, and non-transitory computer readable medium further include identifying a plurality of superpixels in the input texture image, wherein each of the plurality of intermediate texture images include a different subset of the plurality of superpixels based on a corresponding mask of the plurality of image masks. Some examples of the method, apparatus, and non-transitory computer readable medium further include obtaining a plurality of frames of a video, wherein the plurality of image masks corresponds to the plurality of frames, respectively. Some examples further include combining the plurality of image assets and the plurality of frames of the video, respectively, to obtain a texture effect video.

Some examples of the method, apparatus, and non-transitory computer readable medium further include obtaining a plurality of glyph images, wherein the plurality of image masks corresponds to the plurality of glyph images, respectively. Some examples further include combining the plurality of image assets and the plurality of glyph images to obtain a combined glyph image. Some examples of the method, apparatus, and non-transitory computer readable medium further include performing a diffusion process on a random seed. Some examples of the method, apparatus, and non-transitory computer readable medium further include obtaining a plurality of random seeds, wherein each of the plurality of image assets corresponds to a different random seed from the plurality of random seeds.

A method for visual effects generation is described. One or more aspects of the method include obtaining an input texture image and an image mask; identifying a border region of the image mask; combining the input texture image with the image mask to obtain a intermediate texture image that include a texture from the input texture image in the border region; and generating, using the image generation model, an image asset corresponding to the image mask based on the texture image, wherein the texture image has a texture based on the input texture image in at least a portion of the border region.

Some examples of the method, apparatus, and non-transitory computer readable medium further include identifying a plurality of superpixels of the input texture image that overlap the pixels of the image mask, wherein the portion of the border region is based on the plurality of superpixels. Some examples of the method, apparatus, and non-transitory computer readable medium further include generating an expanded image mask based on the image mask, wherein the border region is based on the image mask.

Some examples of the method, apparatus, and non-transitory computer readable medium further include obtaining a plurality of frames of a video. Some examples further include generating a plurality of image masks based on the plurality of frames, respectively. Some examples further include combining a plurality of image assets and the plurality of frames of the video, respectively, to obtain a texture effect video. Some examples of the method, apparatus, and non-transitory computer readable medium further include obtaining a plurality of glyph images. Some examples further include generating a plurality of image masks based on the plurality of glyph images, respectively. Some examples further include combining a plurality of image assets and the plurality of glyph images to obtain a combined glyph image.

FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIGS. 5-6.

Referring to FIG. 1, an example of the texture image generation process is illustrated. In this example, user 100 provides an input texture image and a text prompt “Tiny rose petals” to the image processing apparatus 110, either directly or via user device 105 and cloud 115. The image processing apparatus 110 then processes the input texture image and the text prompt to generate image assets that incorporate the desired visual characteristics.

The image processing apparatus 110 employs a texture generation model, which may include a diffusion model, to generate multiple image assets based on the input texture image and the text prompt. The text prompt “Tiny rose petals” guides the generation process, ensuring that the resulting image assets feature small, delicate rose petals as the primary visual element. The texture generation model analyzes the input texture image and the text prompt, extracting relevant features and patterns to create a coherent and visually appealing set of image assets.

During the generation process, the image processing apparatus 110 may utilize various components to enhance the quality and consistency of the output image assets. For example, a mask extraction component can be used to generate image masks based on the input texture image, identifying specific regions of interest where the rose petal textures should be applied. A intermediate texture component can then combine the input texture image with the generated masks to create intermediate texture images that serve as intermediates in the generation process.

Additionally, a superpixel component may be employed to identify homogeneous regions within the input texture image, allowing for localized texture variations in the output images. The texture generation model takes these intermediate texture images, along with the text prompt encoding, and generates the final image assets that seamlessly integrate the tiny rose petal textures into the desired regions.

The resultant image assets are then returned to user 100 via cloud 115 and user device 105. These image assets can be used as consistent visual elements across various design projects, ensuring a cohesive and aesthetically pleasing appearance. The image processing apparatus 110 thus demonstrates its capability to transform user-provided image assets and text prompts into high-quality, thematically consistent image assets that can be readily applied in different contexts.

User device 105 may be a personal computer, laptop computer, mainframe computer, palmtop computer, personal assistant, mobile device, or any other suitable processing apparatus. In some examples, user device 105 includes software that incorporates an image processing application (e.g., query answering, image editing, relationship detection). In some examples, the image editing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., a remote-control device interfaced with the user interface directly or through an I/O controller module). In some cases, a user interface may be a graphical user interface (GUI). In some examples, a user interface may be represented in code that is sent to the user device 105 and rendered locally by a browser. The process of using the image processing apparatus 110 is further described with reference to FIG. 2.

Image processing apparatus 110 includes a computer implemented network comprising an image encoder, a text encoder, a multi-modal encoder, and a decoder. Image processing apparatus 110 may also include a processor unit, a memory unit, an I/O module, and a training component. The training component is used to train a machine learning model (or an image processing network). Additionally, image processing apparatus 110 can communicate with database 120 via cloud 115. In some cases, the architecture of the image processing network is also referred to as a network, a machine learning model, or a network model. Further detail regarding the architecture of image processing apparatus 110 is provided with reference to FIGS. 5-6. Further detail regarding the operation of image processing apparatus 110 is provided with reference to FIGS. 5-6.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with the database controller. In other cases, database controllers may operate automatically without user interaction.

Figure 2:
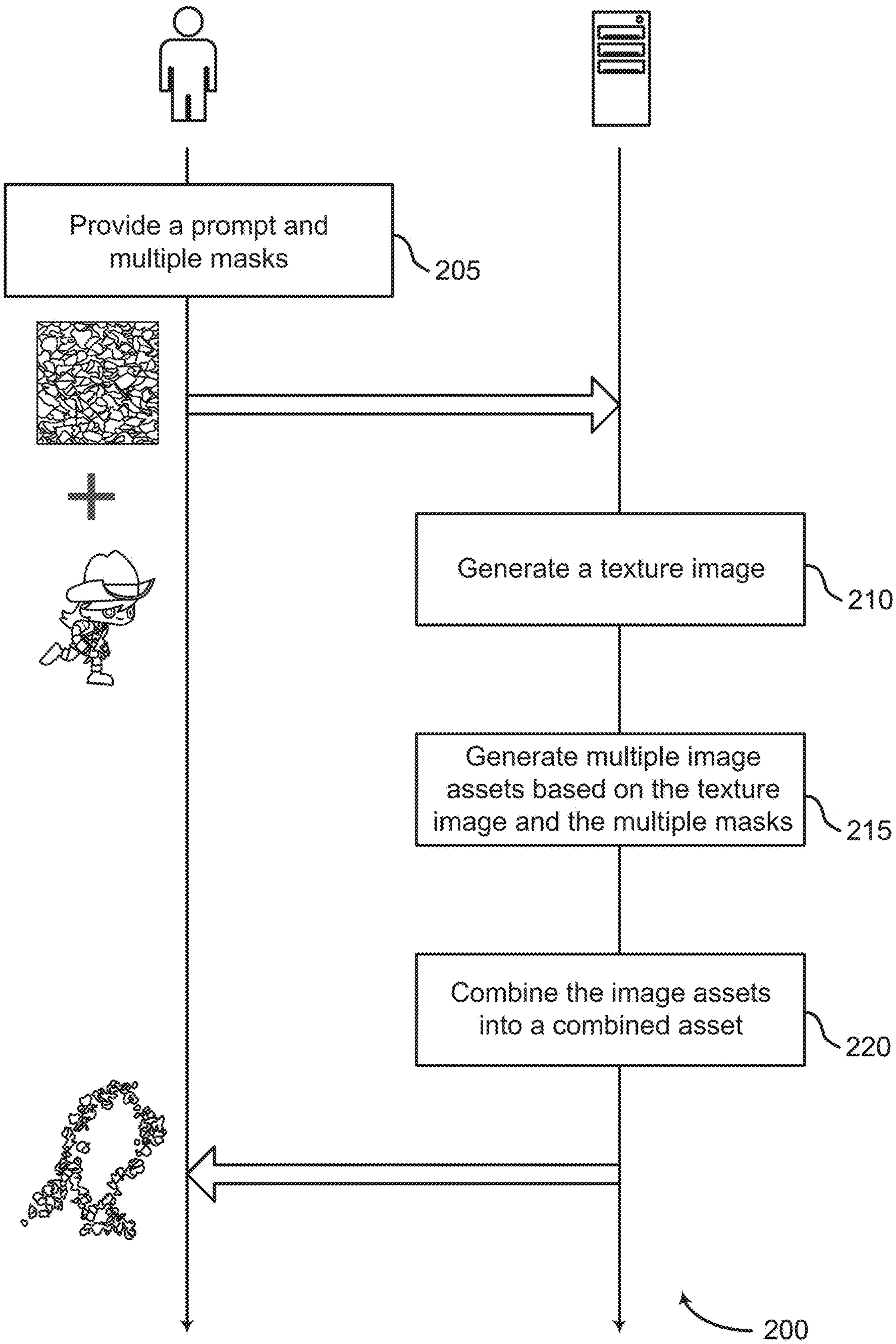
FIG. 2 shows an example of an image asset generation application according to aspects of the present disclosure.

FIG. 2 shows an example of an image asset generation application according to aspects of the present disclosure. The texture image generation application is an example of, or includes aspects of, the corresponding element described with reference to FIGS. 1 and 3-11.

At operation 205, the user provides a prompt and multiple masks. In some examples, the input texture image may be a photograph, a digital painting, or any other image that contains the desired texture elements. The image masks indicate the specific regions where the texture should be applied or emphasized. In some cases, the operations of this step are performed by a user as described with reference to FIG. 1.

In some examples, the user may provide a photograph of rose petals as the input texture image, along with image masks that outline the desired regions for applying the rose petal texture. In some examples, the user may input a text prompt, such as "Tiny rose petals," to guide the generation of the texture image. The system would then use a generative model, like a diffusion model, to create a texture image that resembles tiny rose petals based on the provided prompt.

At operation 210, the system generates a texture image. In some cases, the operations of this step are performed by an image processing apparatus as described with reference to FIGS. 6-7. For example, during operation 210, the system processes the input texture image and the image masks to create intermediate texture images.

For example, the system may combine the rose petal texture image with the provided image masks to create intermediate texture images. These intermediate images may feature the rose petal texture within the masked regions, preserving the details and color variations of the petals.

In some examples, the system may identify a border region of the image mask. The border region represents the area where the texture should be applied. The border region may be determined by identifying superpixels of the input texture image that overlap with the pixels of the image mask. The system may combine the input texture image with the image mask to obtain the intermediate texture image that includes the rose petal texture within the border region.

In some examples, the system may generate an expanded image mask based on the original image mask to further refine the border region. The expanded mask may indicate a larger area around the original mask, allowing for a smoother transition between the textured and non-textured regions in the image assets.

At operation 215, the system generates multiple image assets based on the texture image and the multiple masks. In some cases, the operations of this step are performed by an image processing apparatus as described with reference to FIGS. 6-7. For example, at operation 215, the system uses a texture generation model, which may include a diffusion model, to generate multiple image assets.

For example, the system may use the intermediate texture images as input to the texture generation model. The model may then synthesize a set of image assets that seamlessly integrate the rose petal texture into the desired regions while maintaining consistency across the generated images. Each image asset may correspond to a different random seed.

At operation 220, the system combines the image assets into a combined asset. In some cases, the operations of this step are performed by an image processing apparatus as described with reference to FIGS. 6-7. For example, during operation 220, the system displays the generated image assets to the user, showcasing the results of the texture image generation process. The user can then review the image assets to assess their quality, consistency, and adherence to the desired visual characteristics. If needed, the user has the option to modify the input texture image, adjust the image masks, or fine-tune other parameters to generate a different set of image assets that better align with their creative vision.

In some examples, the user may use the system to create a texture effect video featuring the tiny rose petal texture. In these examples, the system obtains multiple frames from a video, along with corresponding image masks for each frame. The generated rose petal image assets are combined with respective video frames. In this way, the system generates a visually cohesive video where the tiny rose petal texture appears consistently throughout the sequence.

In some examples, the user may provide a set of glyph images, such as individual letters or symbols, along with corresponding image masks that define the shape of each glyph. The system generates image assets featuring the tiny rose petal texture for each glyph based on each glyph's respective mask. These image assets may be combined with the original glyph images to create a combined glyph image where the rose petal texture is applied consistently across all the glyphs.

Figure 3:
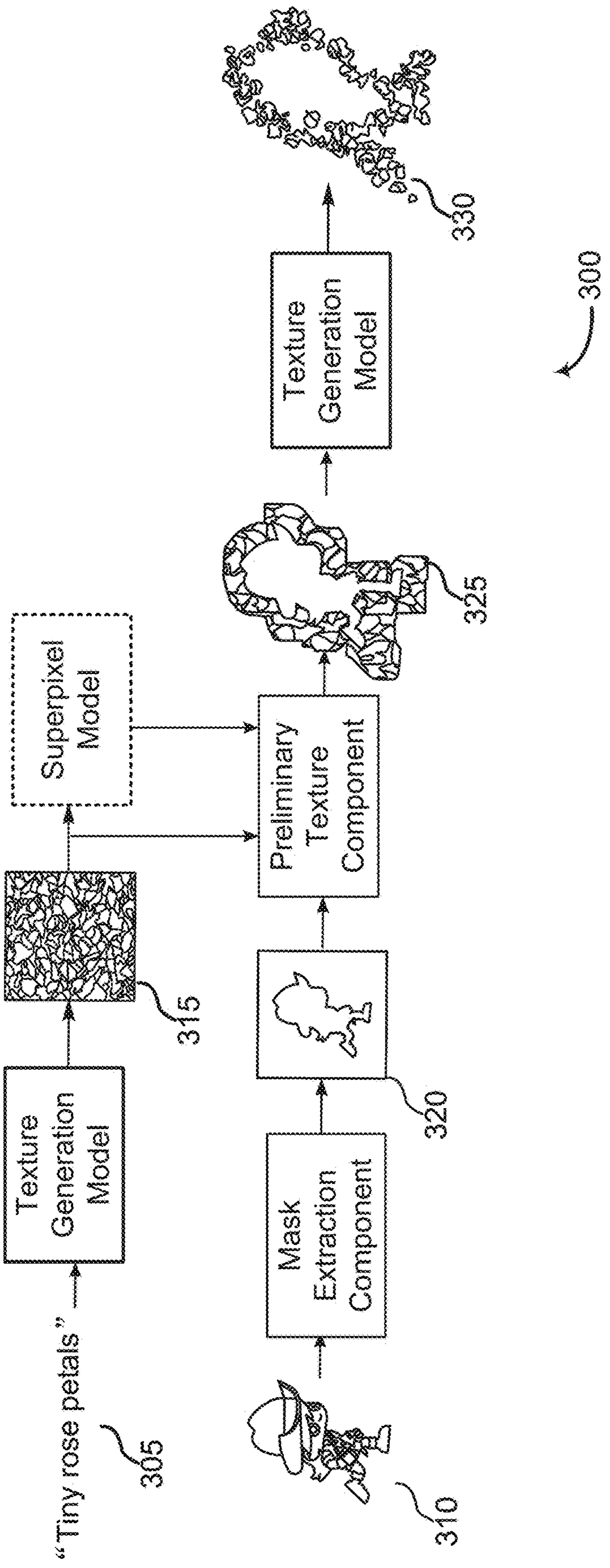
FIG. 3 shows an example of an image asset generation application according to aspects of the present disclosure.

FIG. 3 illustrates an example of an image asset generation application 300 according to aspects of the present disclosure. The application aims to generate multiple image assets with coherent visual styles based on user-defined criteria, such as text prompts or directly provided texture images and masks. The application is an example of, or includes aspects of, the corresponding element described with reference to FIGS. 1-2, 4-9, and 11.

According to some embodiments, texture image generation application 300 involves generating consistent visual effects across multiple output images The consistency of visual effects may be assessed based on whether the perceptual difference between the effects remains below a predetermined threshold so that the effects are not perceived as inconsistent by the user. For example, this consistency can be determined based on the distance in pixel space between two images $I_1$ and $I_2$. For example, within a Euclidean embedding space $E_s$ of images, the Euclidean distance between the embeddings in $E_s$ of $I_1$ and $I_2$ may be used for determining the perceptual distance of the two images in pixel space.

Image generation process $P_{gen}$ may translate an embedding $e_{start}$ from an embedding space $E_{start}$ into an image $I_{gen}$. Considering that under $P_{gen}$, neighboring points of $e_{start}$ leads to neighboring images of $I_{gen}$ embedding space, $P_{gen}$ can be used for generating images that have consistent effects. Accordingly, diffusion-based image generation methods can generate coherent effects and therefore may be employed to produce coherent effects. In some cases, this approach involves identifying an initial starting points $e_{start}$ for the diffusion process, such that the output effects will be in the perceptual vicinity. According to some embodiments, initiating a diffusion process from a seed image derived from processing a texture image results in coherent outcomes.

The image generation model leverage textures and masks for creating coherent visual effects. The inclusion of textures contributes to the consistency of generated elements, and the inclusion of masks may determine the shape and boundary of the desired effects. In some cases, the image generation model enables comprehensive user guidance. For example, textures can either be provided by the user, offering enhanced control over the style of the outcome, or generated through a diffusion-based model utilizing a user-specified prompt P and seed S, adding to the system's versatility. The masks can be supplied directly by the user or generated automatically to match the specific requirements of the effect. These masks can be further processed to generate full, partial, or outline effects.

Upon integrating the texture with one or more masks, a superpixels algorithm may be employed to identify local clusters of pixels within the texture. This process involves polygons intersecting with the mask, grouping areas of overlap to create an intermediate effect mask. The creation of this mask enhances the detail of the effect while avoiding undesirable stark transitions. Utilizing the superpixels algorithm is optional, and the system provides users the discretion to apply it based on their preferences. The intermediate effect mask is then utilized to extract the effect seed image from the texture, laying the groundwork for the generation of coherent results.

The process continues with the application of $P_{gen}$, leveraging the seed image to produce the final effect. $P_{gen}$ employs an image-to-image conversion technique to ensure the coherence of the outcomes by utilizing similar starting points in the image generation process, aligned with the diffusion model utilized for the initial texture creation. This approach enables the manipulation of the texture through various masks, ensuring the initial generation point maintains coherence, thus allowing for the use of alternative seeds in addition to the texture generation seed S without impacting the coherence or performance of the results. This method is particularly advantageous for creating assets with a consistent appearance.

Referring to FIG. 3, texture image generation application 300 begins with having the text prompt 305 as input for an image generation model. The image generation model may be a texture generation model that generates multiple image assets having consistent visual effects. The image generation model may include a diffusion model. The text prompt 305 may indicate the stylistic and thematic direction of the generated image assets. This may allow for a high degree of customization based on user-defined criteria. For example, the text prompt 305 is "Tiny rose petals," and the texture generation model generates image assets featuring small, delicate rose petals which can be used for keeping a consistent visual style across images generated based on the image assets.

The image generation model may also take input image 310 as input. The input image 310 may be used to generate image masks. These masks indicate the areas of the input image that will be enhanced or altered by the applied textures. For example, input image 310 may be used to provide masks for identifying and delineating portions of interest, which are then encapsulated within the generated image mask 320. This step ensures that the texture effects are aligned with the intended portions of the input image, thereby enhancing the overall coherence and visual appeal of the final output. A mask extraction component may be used to take input image 310 as input and outputs image mask 320.

Subsequently, input texture image 315 is generated. This input texture image 315 may be used for the generation of further effects, embodying the desired texture characteristics to be applied across various assets. By combining the input texture image 315 with the image mask 320, a intermediate texture image 325 is generated. The intermediate texture image 325 may establish the initial layout and distribution of the texture effects in accordance with the designated areas outlined by the mask. A intermediate texture component may be used to image mask 320 as input and outputs intermediate texture image 325.

In some cases, the input texture image 315 and the image mask 320 can be directly provided by users, including both human users and machine. This allows for greater control and flexibility in the generation of consistent visual effects. For example, a human user may provide a specific texture image that they wish to use for the desired effect, while a machine user, such as an automated design system, may generate and provide the texture image and image mask based on predefined rules or algorithms.

In some cases, an optional superpixel model may be employed to further refine the input texture image 315 before it is input into the intermediate texture component. The superpixel model takes the input texture image 315 as input and segments it into small, homogeneous regions called superpixels. This process can help to simplify the texture image and reduce noise while preserving important visual features. The output of the superpixel model is then input into the intermediate texture component, which combines it with the image mask 320 to generate the intermediate texture image 325. The use of the superpixel model is optional and can be determined based on the specific requirements of the application and the desired level of detail in the generated visual effects.

Next, the texture generation model, which is the same model that takes text prompt 305 as input and outputs input texture image 315, takes intermediate texture image 325 as input and outputs texture image 330. The texture image 330 integrates the texture effects within the confines of the previously defined mask, rendering it ready for application to the desired visual assets.

FIG. 3 thus illustrates an adaptable approach to generating customized visual effects. This approach may not only facilitate the creation of assets with uniform appearance designs but also introduce precision and coherence that is particularly advantageous for design applications. For example, in FIG. 3, the architecture showcases the possible inputs for texture and mask on the left, such as the rose petals texture and the circular mask around the sprite. These inputs are then combined to generate a consistent rose petals effect around the sprite, demonstrating the capability of the image generation model to create coherent visual effects based on user-defined textures and masks.

According to some embodiments, the methods and systems used for generating coherent visual effects as illustrated in FIG. 3 are not necessarily limited to a single type of visual asset. In some embodiments, the methods and systems may be used to generate multiple design assets that have coherent visual characteristics, maintaining a visual consistency or coherence among multiple instances of the same type of design asset within a project. For example, if a design includes multiple flowers, there's a desirable expectation that these flowers exhibit a coherent appearance to maintain aesthetic harmony. This principle of coherence is critical for ensuring that design elements look like they belong together, enhancing the overall visual appeal and professionalism of the design.

According to some embodiments, a distinction from glyph effects is the occasional absence of pre-defined masks. Icons may be used as alternatives to pre-defined glyph masks. Integrating these icons into the effect generation pipeline presents a viable solution for the creation of coherent design assets. Additionally, the flexibility of the pipeline to accommodate user-created masks empowers designers with the ability to tailor-make masks specific to their design needs, further enhancing the versatility and applicability of the asset generation process.

According to some embodiments, when it comes to design assets, the coherence requirement is present in the sense that if more than one design asset of the same type, such as a flower, is meant to be used in a design, then it might be desirable that all are coherent. This uniformity makes each asset, whether they are patches of grass, glitter, or smoke, maintain a consistent appearance, enhancing the overall aesthetic cohesion of the design. The same approach as in asset generation can be used for generating single or multiple design assets.

According to some embodiments, in design assets, coherence may be achieved among multiple instances of similar asset types to reach uniformity. This indicates the versatility of the generative AI algorithm, capable of producing both individual and groups of assets that meet the coherence requirement. The ability to apply consistent effects across various types of assets underscores the technology's adaptability to different design needs.

Figure 4:
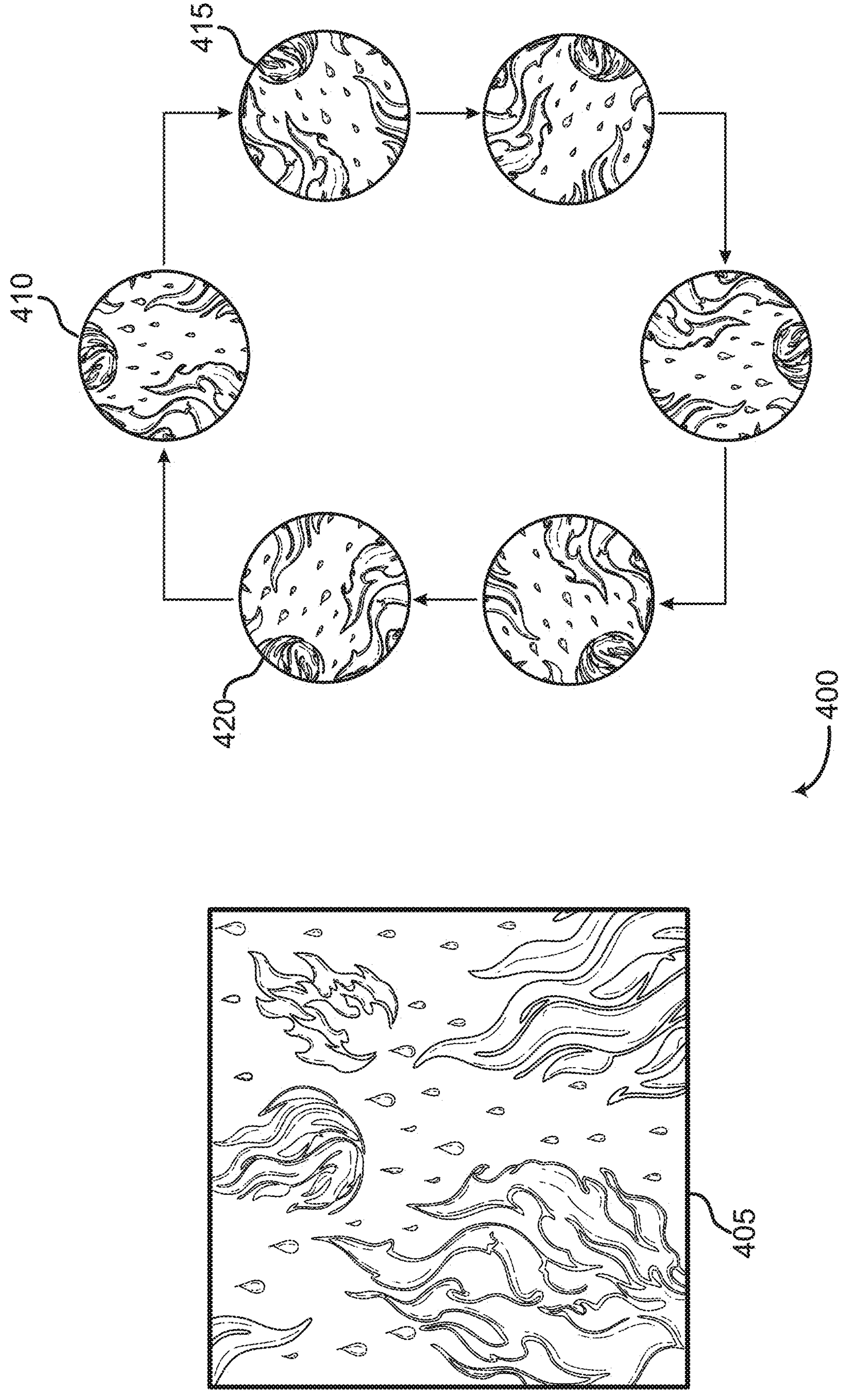
FIG. 4 shows an example of a method of animating static assets according to aspects of the present disclosure.

FIG. 4 shows an example of a method 400 of animating static assets according to aspects of the present disclosure. The method 400 is an example of, or includes aspects of, the corresponding element described with reference to FIGS. 1-3, 5-9, and 11.

According to some embodiments, generating assets with consistent visual effects may be based on using consistent texture image as seed image. The seed image consistency ensures that consistent variations of the effect can be obtained by extracting different starting seed images for the diffusion process. In some examples, the seed image is from the intermediate texture image in FIG. 3. This approach can be used for adding consistent visual effects to dynamic assets.

According to some embodiments, given an animated asset, such as a game sprite, embodiments of the present disclosure can generate a dynamic effect for that animated asset. For example, for an animation represented by a sequence S consisting of N instances, $I_1 \ldots I_n$, of a given asset A, a set of N accompanying effects, $E_1 \ldots E_n$, with effect $E_k$ corresponding to instance $I_k$, such that the obtained effect sequence represents a coherent and visually pleasing animation that can be coupled with the initial animation to boost its visual effect.

For example, starting from an instance $I_k$, a mask of the visual asset is extracted using an automatic mask extraction component, which varies depending on the asset type. For assets such as game sprites, which may have a solid-colored background or an alpha channel, a computer-vision based algorithm may be employed for faster and more cost-effective computation.

In some cases, when the alpha mask is provided, the alpha mask is used directly without further processing. An alpha mask may be a grayscale image that represents the transparency of each pixel in the corresponding image. For example, in an alpha mask, black pixels (e.g., pixel value 0) indicate fully transparent areas, white pixels (e.g., pixel value 255) represent fully opaque areas, and shades of gray represent varying levels of transparency. In some examples, an asset may have an associated alpha mask, and the mask extraction component can directly use this alpha mask for further processing in the pipeline, saving computation time and resources that would otherwise be required to generate the mask using computer vision or machine learning techniques.

According to some embodiments, an asset, e.g., an image, may have solid-colored background, and a flood-fill algorithm may be applied starting from randomly placed points along the borders of the image. The starting points have the background color, and the background color is determined by detecting the dominant color among the border of the image. In some cases, when the random point falls on a non-background point, which indicates that the random point belongs to the asset, an offset is added to ensure the point moves outside the asset. For example, a flood-fill approach is preferred over color-based masking to prevent situations where parts of the asset sharing the same color as the background are mistakenly considered background and eliminated.

In some cases, complex assets may contain background zones within them or lack a solid-colored background. For such assets, a machine-learning based background detection algorithm is utilized to generate the mask of the asset. This algorithm learns to distinguish between the foreground (e.g., the asset itself) and the background regions of the image based on a large dataset of annotated examples. In some examples, the machine learning model, once trained, can accurately predict the mask of the asset by classifying each pixel as either foreground or background. This approach may be useful for assets with intricate backgrounds or those without a consistent background color, as it can handle more complex scenarios compared to simpler methods like color-based masking or flood-fill algorithms. The output of the machine-learning based background detection algorithm is a binary mask that represents the asset's silhouette, which can then be used in the subsequent stages of the asset generation pipeline. In these examples, the user has the option to choose between the computer-vision based algorithm and the machine-learning based algorithm to achieve the desired results.

According to some embodiments, a generated mask may be dilated to make sure the effect is visible if placed behind the character. Variations of the approach can be done with the regular, outline and bolding effects. The automatically generated mask can be combined with user-defined zones to create localized effects for the animation. The rest of the effect generation pipeline may be substantially similar to the application illustrated in FIG. 3. The coherence property of the pipeline ensures that the result will be a viable animation.

According to some embodiments, a downside of some embodiments is the reliance on a prior animation. For static assets, which do not have a prior animation, the presented effects may be difficult to generate. To address this problem, a spatial jitter variation inducing masking algorithm is proposed. In some examples, this algorithm enables animating static assets through circular path mask movement.

According to some embodiments, given a single mask M we generate an arbitrarily long animation by translating the mask in pixel space prior to using it to cut the texture and obtain the seed image. For a desired animation of N frames, a trajectory on a circle of radius r is utilized. N uniformly distributed points on this trajectory are generated, starting from the origin, by splitting the interval $[0, 2\pi]$ in N equal width intervals and taking the boundaries of these intervals as the offset values $O_1 \ldots O_n$. For an offset $O_k$, $d*\sin(O_k)$ are added on the Y axis and $d*\cos(O_k)$ on the X axis. This results in a circuit, which translates to a coherent animation that loops, where d is a hyperparameter which controls the variation of the outputs. The higher the value, the more varied the results will be.

According to some embodiments, this approach can be applied in asset generation. When generating an asset for a design, the user has the option to animate it or to generate an animated one from the get-go. This enriches the toolset of designers and allows for more dynamism during the design process.

Referring to FIG. 4, the process of animating static assets through circular path mask movement involves the original static image 405. For a desired animation of N frames, a trajectory on a circle of radius r is utilized. N uniformly distributed points on this trajectory are generated, starting from the origin, by splitting the interval $[0, 2\pi]$ into N equal width intervals and taking the boundaries of these intervals as the offset values $O_i$. For an offset $O_k$, $d*\sin(O_k)$ are added on the Y axis and $d*\cos(O_k)$ on the X axis. This results in a circular path mask movement that generates a sequence of N images based on the original static image 405. The first image 410 may be obtained based on the original static image 405. The second image 415 is generated by applying the circular path mask movement with offset $O_1$ to the first image 410. The mask then moves along the circular path to the second offset $O_2$, generating another image, and this process continues until the N-th offset $O_n$, generating the N-th image. In FIG. 4, when N=5, this process continues until generating the third image 420. The mask then returns to complete the loop and resulting in a coherent animation.

Figure 5:
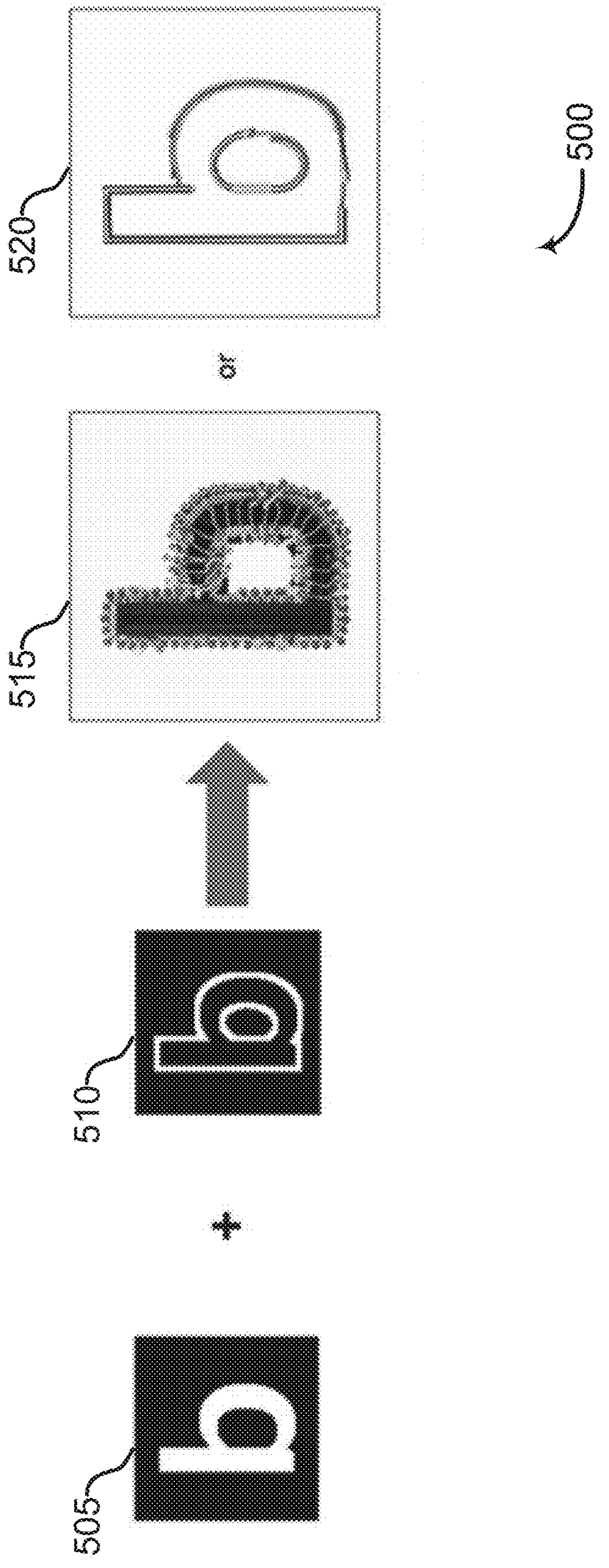
FIG. 5 shows a method of generating stylized bolding and outline according to aspects of the present disclosure.

FIG. 5 shows a method 500 of generating stylized bolding and outline according to aspects of the present disclosure. The method 500 may be an example of, or includes aspects of, the corresponding element described with reference to FIGS. 1-4, 6-9, and 11.

Specifically, a process of generating stylized bolding and stylized outline effects for glyphs is illustrated in FIG. 5. This process is particularly effective for glyph effect generation, as it ensures a high level of coherence among the generated effects, which is crucial for maintaining consistency when reading text or viewing multiple symbols.

To generate coherent glyph effects, the process begins with providing a texture image. This texture image serves as the common starting seed for all glyphs, ensuring that the generated effects maintain a consistent visual style. The glyphs themselves are then used as masks to extract the corresponding regions from the texture image. These extracted regions form the starting images that are subsequently fed into an image-to-image diffusion model. The glyph masks undergo various post-processing techniques to generate different types of effects. Two of the effects are stylized bolding and stylized outline, which can significantly enhance the legibility of the letters, especially for thin fonts.

Referring to FIG. 5, stylized bolding and stylized outline using the letter “b” are used as an example. The front mask 505 represents the original glyph mask, which is used to extract the corresponding region from the texture image. The contour mask 510 may be generated by expanding the front mask 505 to create a larger region around the glyph. By combining the front mask 505 and the contour mask 510, the image generation model can generate either the stylized bolding effect 515 or the stylized outline effect 520, depending on the specific post-processing technique applied.

For example, stylized bolding effect 515 is achieved by stylizing a region around the initial font mask according to a given prompt while preserving the original font color in the output image. For example, stylized outline effect 520 involves stylizing a thin border along the initial font mask while discarding the initial font color.

According to some embodiments, when generating the stylized bolding effect, in cases where the original font color (e.g., black) is omitted from the input image, the output image may not maintain the font color entirely unchanged. Instead, the font color may undergo a subtle stylization influenced by the input prompt, introducing an additional level of artistic flair to the generated effect. In examples where the font color is stylized, when the black font color is slightly modified based on the input prompt, a visually enriched output image that harmonizes with the overall stylistic theme may be generated.

Visual Asset and Effect Generation Apparatus

An apparatus for visual effects generation is described. One or more aspects of the apparatus include at least one processor; at least one memory storing instruction executable by the at least one processor; and an image generation model comprising parameters stored in the at least one memory and trained to generate a plurality of image assets corresponding to a plurality of image masks based on a plurality of intermediate texture images, respectively, wherein the plurality of image assets have a consistent texture based on an input texture image, wherein the intermediate texture images are based on the input texture image and the plurality of texture masks.

A texture image refers to an image that represents the surface appearance of an object, such as the object’s color, pattern, or material properties. Texture images may be used to add visual detail and realism to graphics. A texture image may not be used as a standalone element in a scene. For example, a texture image is applied to an object’s mesh or surface to contribute to the overall visual composition.

Assets refer to elements that can be placed directly into a scene, such as in a video game. In some examples, assets may indicate a meaning or purpose. In some examples, assets can be used for compositing scenes. Assets have both a shape and a texture that fits the shape, which is different from texture images that do not have a shape on the texture images’ own.

Effects refer to visual enhancements or embellishments that accompany elements in a scene, adding dynamism, atmosphere, or visual interest. Effects can be applied to existing assets or used as standalone elements in certain scenarios. For example, a particle effect simulating falling rocks can be used to enhance the atmosphere of a gemstone quarry in the background of a scene.

In some embodiments, a texture image is used as a starting point that can be turned into assets or effects. Unlike some methods in which a mesh is generated and a texture is applied to the mesh, embodiments of the present disclosure use the texture image as a starting point for generating visually consistent and coherent elements without the need for complex mesh generation or manual texture mapping. The texture image is used to generate assets and effects that can be integrated into the desired visual composition.

In some aspects, the image generation model is trained to generate the texture image based on a text prompt. Some examples of the apparatus and method further include a intermediate texture component configured to combine the input texture image with each of the plurality of image masks to obtain the plurality of intermediate texture images.

Some examples of the apparatus and method further include a superpixel component configured to identify a plurality of superpixels in the input texture image, wherein each of the plurality of intermediate texture images include a different subset of the plurality of superpixels. Some examples of the apparatus and method further include a mask extraction component configured to generate the plurality of image masks based on a plurality of input images, respectively, wherein each of the plurality of image masks indicates a location of an element from a corresponding input image from the plurality of input images.

Some examples of the apparatus and method further include an animation component configured to combine the plurality of image assets to obtain a texture effect video, wherein the plurality of image assets are temporally consistent based on the plurality of frames of the video. In some aspects, thing image generation model comprises a diffusion model.

Figure 6:
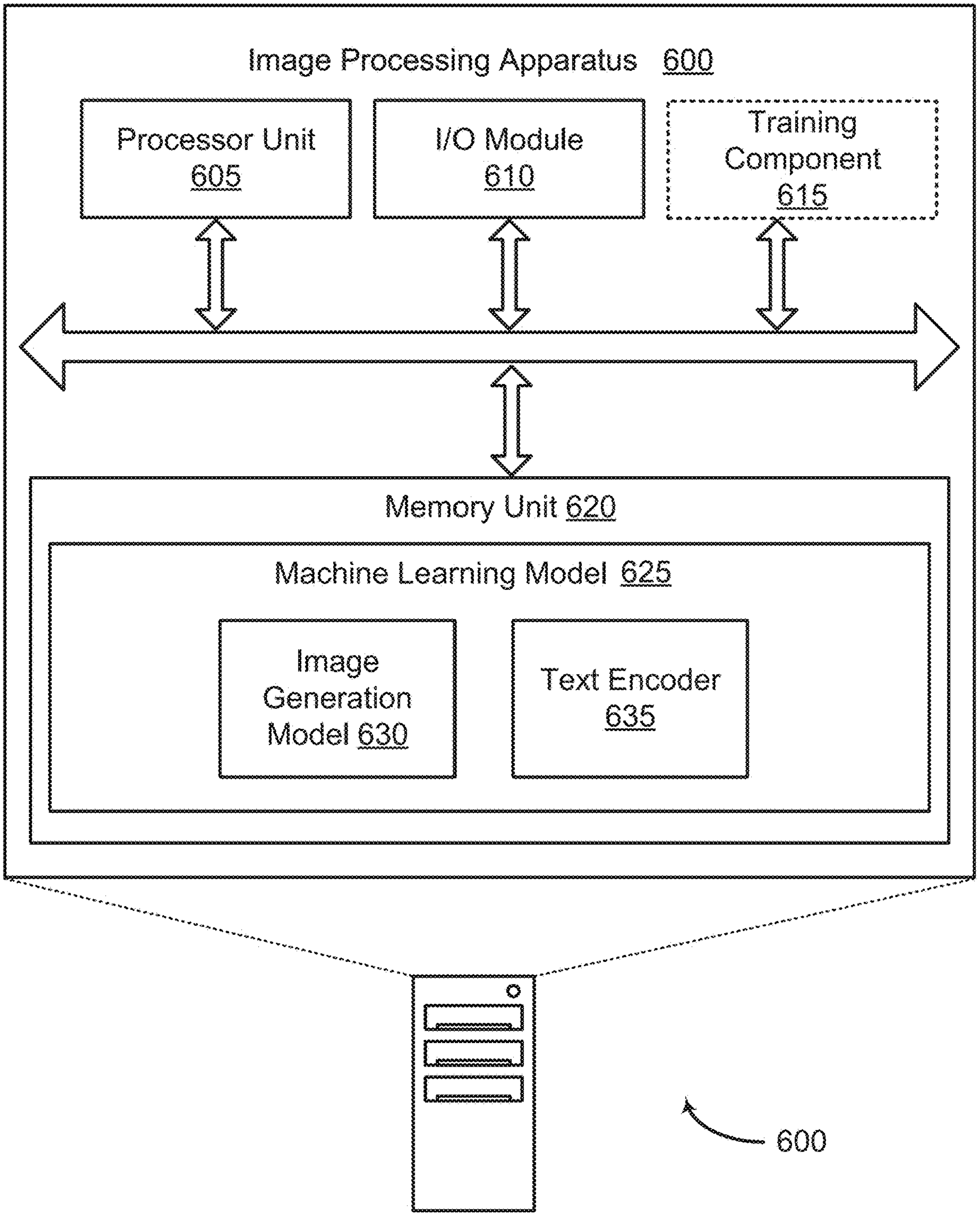
FIG. 6 shows an example of an image generation apparatus according to aspects of the present disclosure.

FIG. 6 shows an example of an image generation apparatus 600 according to aspects of the present disclosure. Image generation apparatus 600 is an example of, or includes aspects of, the corresponding element described with reference to FIG. 1. In one aspect, image generation apparatus 600 includes processor unit 605, I/O module 610, training component 615, memory unit 620, machine learning model 625 including image generation model 630 and text encoder 635.

Processor unit 605 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 605 is configured to operate a memory array using a memory controller. In other cases, a memory controller is integrated into processor unit 605. In some cases, processor unit 605 is configured to execute computer-readable instructions stored in memory unit 620 to perform various functions. In some aspects, processor unit 605 includes special purpose components for modem processing, baseband processing, digital signal processing, or transmission processing. According to aspects, processor unit 605 comprises one or more processors described with reference to FIG. 11.

Memory unit 620 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 605 to perform various functions described herein.

In some cases, memory unit 620 includes a basic input/output system (BIOS) that controls basic hardware or software operations, such as an interaction with peripheral components or devices. In some cases, memory unit 620 includes a memory controller that operates memory cells of memory unit 620. For example, the memory controller may include a row decoder, column decoder, or both. In some cases, memory cells within memory unit 620 store information in the form of a logical state. According to aspects, memory unit 620 comprises the memory subsystem described with reference to FIG. 11.

According to aspects, image generation apparatus 600 uses one or more processors of processor unit 605 to execute instructions stored in memory unit 620 to perform functions described herein. For example, in some cases, the image generation apparatus 600 obtains a prompt describing an image element. For example, the image element may be corresponding to a plurality of concepts.

Machine learning parameters, also known as model parameters or weights, are variables that provide a behavior and characteristics of a machine learning model. Machine learning parameters can be learned or estimated from training data and are used to make predictions or perform tasks based on learned patterns and relationships in the data.

Machine learning parameters are typically adjusted during a training process to minimize a loss function or maximize a performance metric. The goal of the training process is to find optimal values for the parameters that allow the machine learning model to make accurate predictions or perform well on the given task.

For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning parameters are used to make predictions on new, unseen data.

Artificial neural networks (ANNs) have numerous parameters, including weights and biases associated with each neuron in the network, which control a degree of connections between neurons and influence the neural network's ability to capture complex patterns in data.

An ANN is a hardware component or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes.

In some cases, the signals between nodes comprise real numbers, and the output of each node is computed by a function of the sum of its inputs. In some examples, nodes may determine their output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Referring to FIG. 6, the machine learning model 625 includes an image generation model 630 and a text encoder 635. The image generation model 630 is responsible for generating texture images based on various inputs, such as text prompts, input texture images, and intermediate texture images. The text encoder 635 processes text prompts and converts them into a format that can be understood by the image generation model 630.

The machine learning model 625 may further include several additional components that enhance its functionality and versatility. The image generation model 630 can be trained to generate texture images based on text prompts. This allows users to provide descriptive text inputs that guide the model in creating specific types of textures. A intermediate texture component can be included to combine the input texture image with each of the plurality of image masks, resulting in a set of intermediate texture images. These intermediate texture images serve as intermediates that incorporate the desired texture characteristics within the regions defined by the masks.

A superpixel component can be added to identify a plurality of superpixels in the input texture image. Superpixels are small, homogeneous regions within the image that share similar visual properties. Each of the intermediate texture images can include a different subset of these superpixels, allowing for localized texture variations. A mask extraction component can be incorporated to generate the plurality of image masks based on a corresponding set of input images. Each image mask indicates the location of a specific element within its respective input image. This component enables the model to focus on specific regions of interest when applying textures.

An animation component can be included to combine the plurality of generated image assets into a coherent texture effect video. This component enables the creation of dynamic and visually appealing animations by sequencing the texture images in a meaningful way. The image generation model 630 can be implemented as a diffusion model. Diffusion models are a class of generative models that learn to generate images by gradually denoising a random input signal. They have shown impressive results in generating high-quality and diverse images based on text prompts or other conditioning information.

According to some embodiments, these components work together with the image generation model 630 and text encoder 635 to provide a comprehensive and flexible solution for generating consistent and visually appealing texture effects. The machine learning model 625 can take advantage of these components to create texture images based on text descriptions, combine them with image masks, incorporate superpixel information, generate animations, and leverage the power of diffusion models for high-quality image generation.

Figure 7:
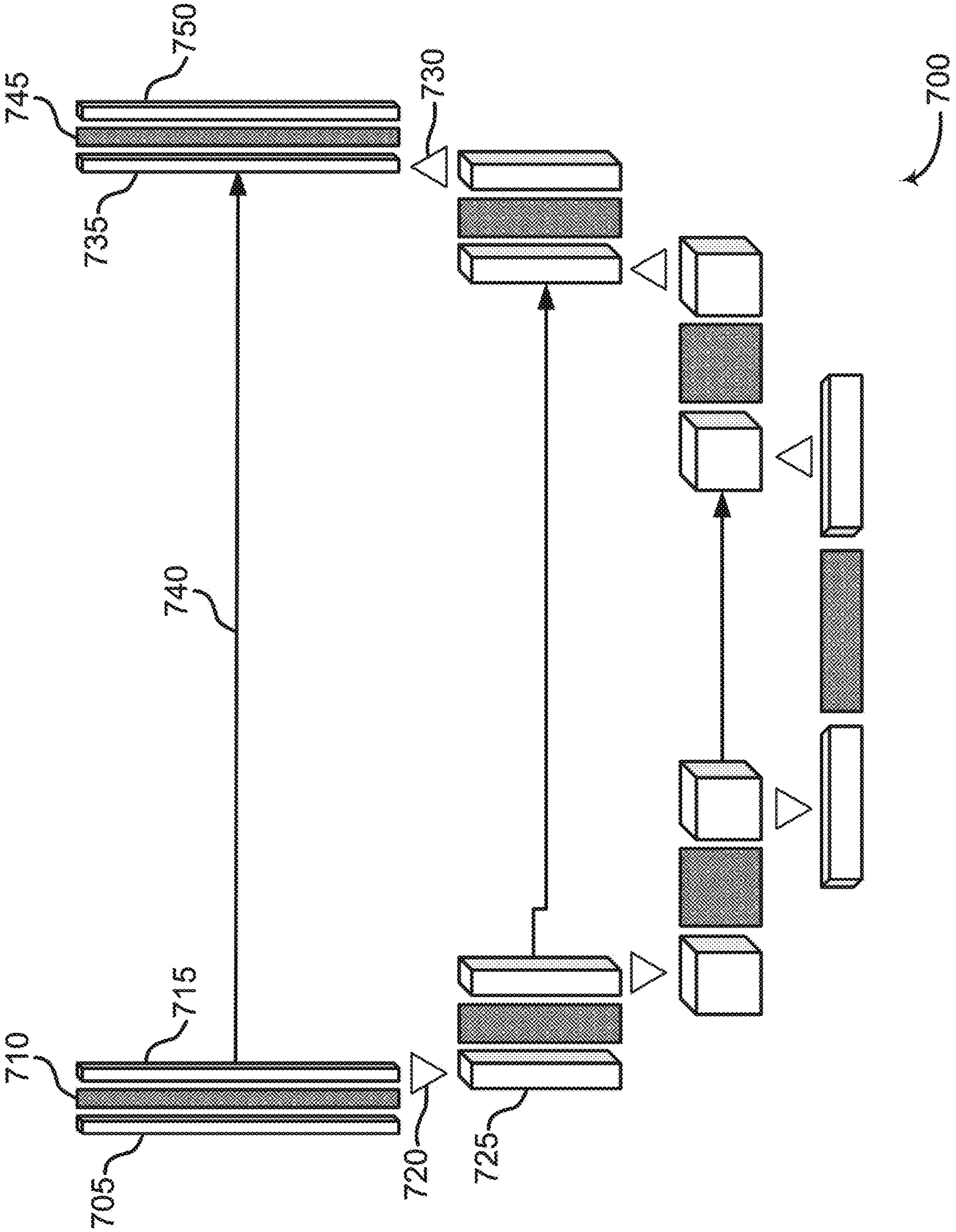
FIG. 7 shows an example of a U-Net according to aspects of the present disclosure.

FIG. 7 shows an example of a U-Net 700 according to aspects of the present disclosure. The U-Net 700 is an example of, or includes aspects of, the corresponding element described with reference to FIGS. 1-6, 8-9, and 10. According to some aspects, a diffusion model comprises an ANN architecture known as a U-Net.

According to some aspects, U-Net 700 receives input features 705, where input features 705 include an initial resolution and an initial number of channels, and processes input features 705 using an initial neural network layer 710 (e.g., a convolutional neural network layer) to produce intermediate features 715.

In some cases, intermediate features 715 are then down-sampled using a down-sampling layer 720 such that down-sampled features 725 have a resolution less than the initial resolution and a number of channels greater than the initial number of channels.

In some cases, this process is repeated multiple times, and then the process is reversed. For example, down-sampled features 725 are up-sampled using up-sampling process 730 to obtain up-sampled features 735. In some cases, up-sampled features 735 are combined with intermediate features 715 having the same resolution and number of channels via skip connection 740. In some cases, the combination of intermediate features 715 and up-sampled features 735 are processed using final neural network layer 745 to produce output features 750. In some cases, output features 750 have the same resolution as the initial resolution and the same number of channels as the initial number of channels.

According to some aspects, U-Net 700 receives additional input features to produce a conditionally generated output. In some cases, the additional input features include a vector representation of an input prompt. In some cases, the additional input features are combined with intermediate features 715 within U-Net 700 at one or more layers. For example, in some cases, a cross-attention module is used to combine the additional input features and intermediate features 715.

Figure 8:
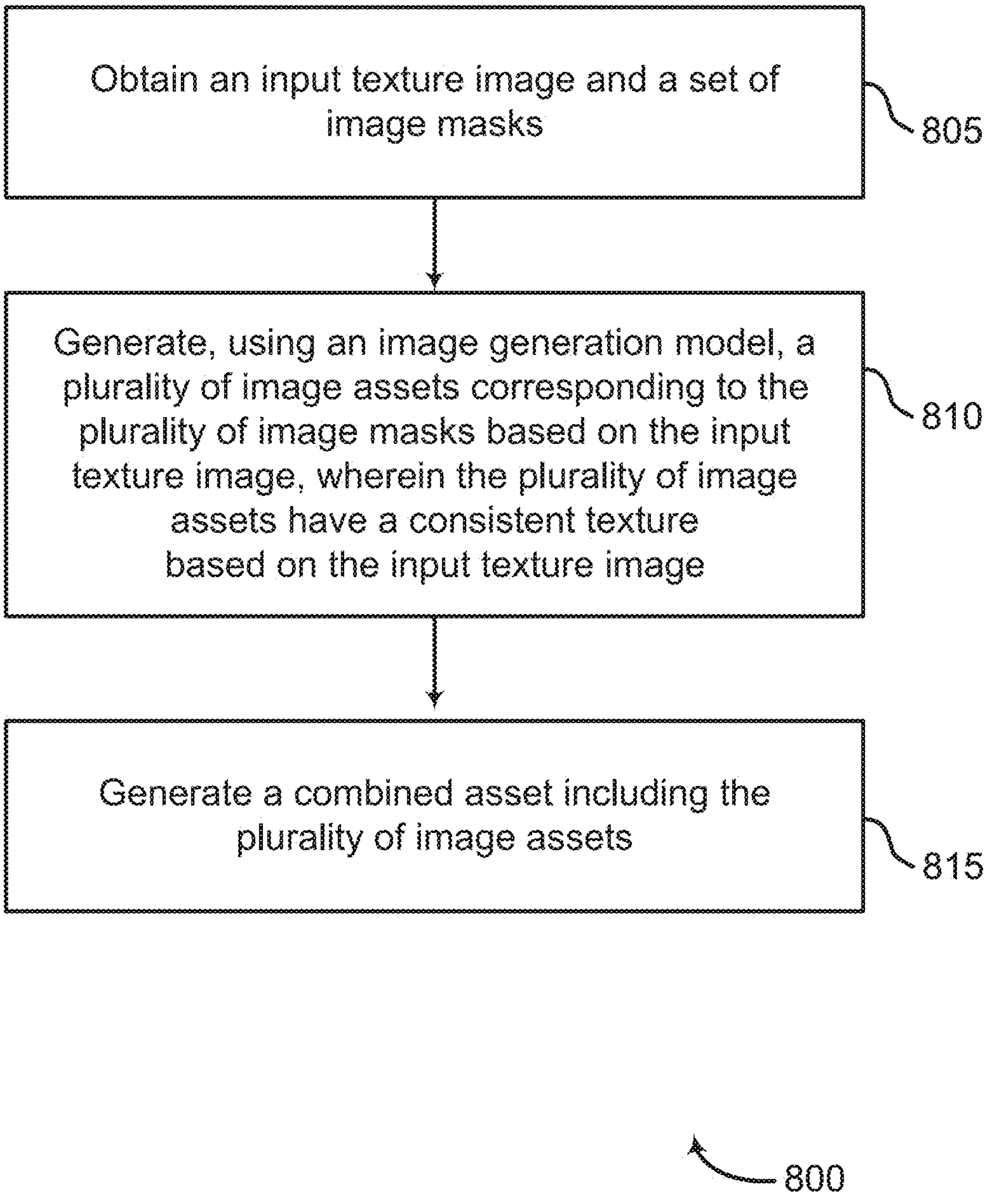
FIG. 8 shows an example of a method for image processing according to aspects of the present disclosure.

FIG. 8 shows an example of a method 800 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system obtains an input texture image and a set of image masks. In some cases, the operations of this step refer to, or may be performed by, an intermediate texture component in an image generation model as described with reference to FIG. 6.

For example, obtaining the texture image may involve obtaining a text prompt and generating the texture image based on the text prompt. The text prompt can describe a desired texture, such as flames, flowers, or smoke, and the system generates a high-resolution texture image accordingly. The set of image masks can be binary images that indicate the regions where the texture should be applied. These masks can be manually created by a user or automatically generated based on other input images or predefined templates. The system may also include a user interface that allows users to upload their own texture images and masks or select from a library of predefined options.

In some examples, the system may include a mask extraction component that automatically generates the set of image masks based on a set of input images. The system may include a mask extraction component that automatically generates the set of image masks using computer vision techniques, such as edge detection or semantic segmentation, to identify the relevant regions in each input image. In some examples, using such automated approach can save time and effort for users who need to generate texture images for a large number of input images.

At operation 810, the system generates, using an image generation model, a plurality of image assets corresponding to the plurality of image masks based on the input texture image. The generated image assets have a consistent texture based on the input texture image. In some cases, the operations of this step refer to, or may be performed by, an image generation model as described with reference to FIG. 6.

For example, the image generation model may be a diffusion model that generates a set of image assets based on the input texture image and the image masks. The diffusion model takes the input texture image and applies it to the regions specified by the image masks, creating image assets with consistent textures across the set. The generated image assets maintain the desired texture characteristics specified by the input texture image and incorporate the shapes and regions defined by the image masks.

In some examples, generating the plurality of image assets may involve obtaining a plurality of random seeds, where each of the plurality of image assets corresponds to a different random seed from the plurality of random seeds. This may enable the model to generate high-quality image assets that exhibit fine details and realistic variations while maintaining consistency in the overall texture.

In some examples, generating the image assets involves combining the input texture image with each of the plurality of image masks to obtain a plurality of intermediate texture images. Each of the plurality of image assets is then generated based on a corresponding intermediate texture image from the plurality of intermediate texture images. The intermediate texture images may be used to apply the input texture to the specific regions determined by each image mask. In some examples, generating the image assets based on these intermediate texture images makes the final output image assets have consistent textures that align with the input texture image while conforming to the shapes and regions specified by the image masks.

In some examples, obtaining the plurality of intermediate texture images includes identifying a plurality of superpixels in the input texture image. In these examples, each of the plurality of intermediate texture images may include a different subset of the plurality of superpixels based on a corresponding mask of the plurality of image masks.

The generated image assets can then be used for creating texture effect videos or combining them with glyph images to create visually consistent and appealing designs. This process leads to consistent texture across the image assets and visual elements with an consistent texture appearance.

At operation 815, the system generates a combined asset including the plurality of image assets. In some cases, the operations of this step refer to, or may be performed by an image generation model as described with reference to FIG. 6.

For example, at operation 815, the combined asset incorporates the generated image assets in a visually consistent manner, enabling users to create diverse visual content with a consistent texture or style. For example, the combined asset may be a texture effect video that integrates the generated image assets with a plurality of frames from an input video. By applying the image assets to the corresponding frames, the system creates dynamic video content with consistent visual effects.

For example, the combined asset may be a glyph image that combines the generated image assets with a plurality of input glyph images. The system may apply the image assets to their respective glyph images, generating a consistent and visually coherent appearance across the entire set of glyphs. The system thus enables users to create stylized text or symbolic representations with a unified texture or style.

In some examples, generating the combined asset includes combining the plurality of image assets and the plurality of frames of the video, respectively, wherein the plurality of image assets are temporally consistent based on the plurality of frames of the video, and wherein the combined asset comprises a texture effect video. The temporal consistency ensures that the image assets are aligned with the motion and progression of the video frames, creating a seamless and coherent texture effect throughout the video sequence.

Figure 9:
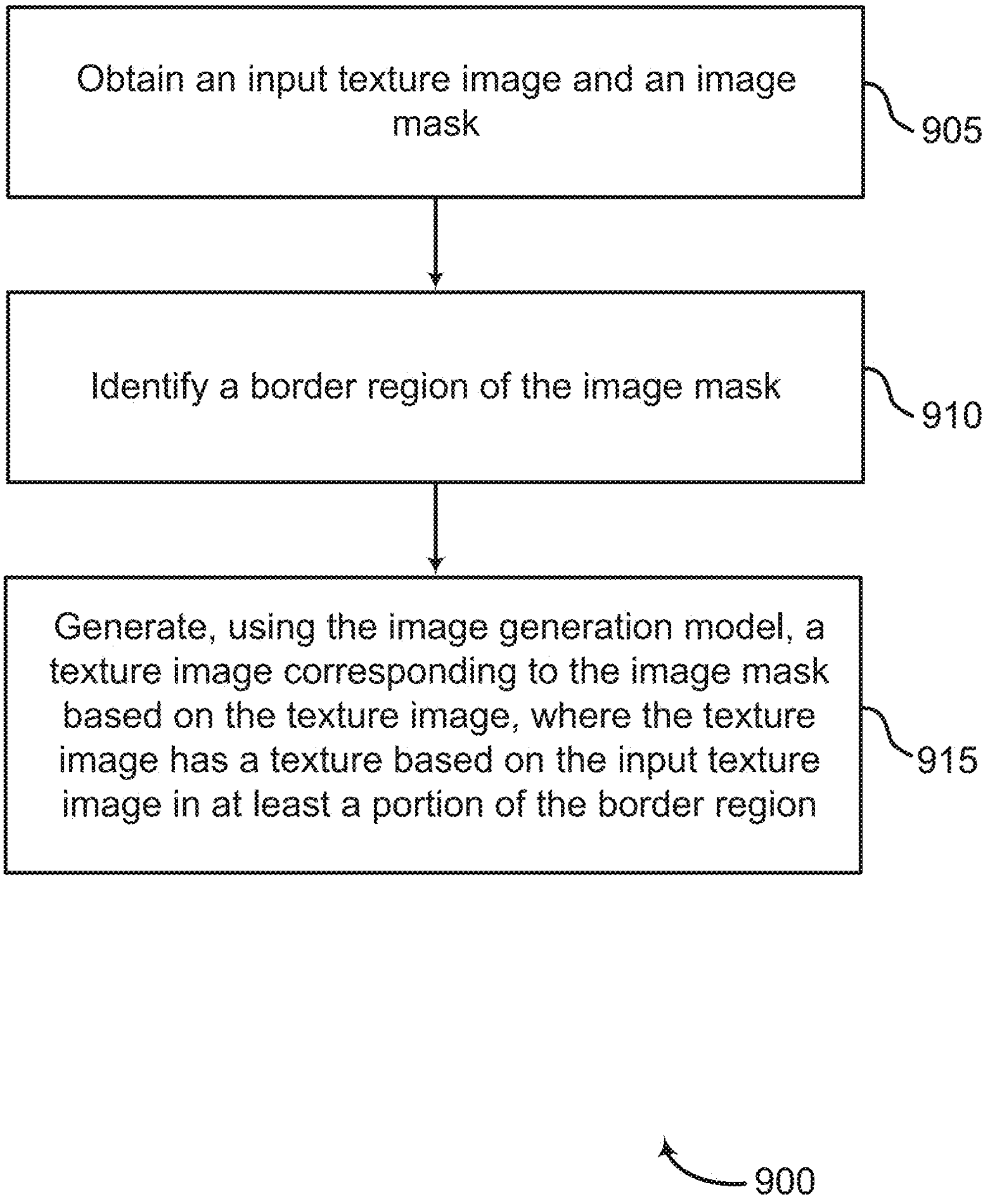
FIG. 9 shows an example of a method for image processing according to aspects of the present disclosure.

FIG. 9 shows an example of a method 900 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system obtains an input texture image and an image mask. In some cases, the operations of this step refer to, or may be performed by, a machine learning model as described with reference to FIG. 5.

For example, the input texture image can be a high-resolution image of a desired texture, such as wood grain, fabric, or stone. The image mask is a binary image that indicates the region where the texture should be applied. The mask can be manually created by a user or automatically generated based on an input image or a predefined template.

At operation 910, the system identifies a border region of the image mask. In some cases, the operations of this step refer to, or may be performed by, a machine learning model as described with reference to FIG. 5.

For example, identifying the border region may involve identifying a plurality of superpixels of the input texture image that overlap the pixels of the image mask. The portion of the border region is then based on the plurality of superpixels. Alternatively, the system may generate an expanded image mask based on the original image mask, and the border region is based on this expanded mask. The border region defines the area where the texture will be blended with the image mask to create a smooth transition.

At operation 915, the system generates, using the image generation model, an image asset corresponding to the image mask based on the intermediate texture image, where the an image asset has a texture based on the input texture image in at least a portion of the border region. In some cases, the operations of this step refer to, or may be performed by, an image generation model as described with reference to FIG. 5. The image generation model may be the same image generation model that is used to generate the input texture image.

For example, the image generation model may be a diffusion model that generates a high-quality an image asset based on the intermediate texture image. The diffusion process starts with a seed image derived from the intermediate texture image and gradually refines it over multiple steps, adding or removing noise based on a learned noise schedule. The generated an image asset maintains the desired texture characteristics specified by the input texture image while introducing natural variations and details, especially in the border region where the texture blends with the background.

In some examples, the system may obtain a plurality of frames of a video and generate a plurality of image masks based on the plurality of frames, respectively. The system can then combine a plurality of image assets and the plurality of frames of the video, respectively, to obtain a texture effect video. This allows for the creation of dynamic textures that change over time, such as animated backgrounds or special effects.

In some examples, the system may obtain a plurality of glyph images and generate a plurality of image masks based on the plurality of glyph images, respectively. The system can then combine a plurality of image assets and the plurality of glyph images to obtain a combined glyph image. This enables the application of consistent textures to multiple glyphs or characters, creating visually appealing text effects or stylized fonts.

Figure 10:
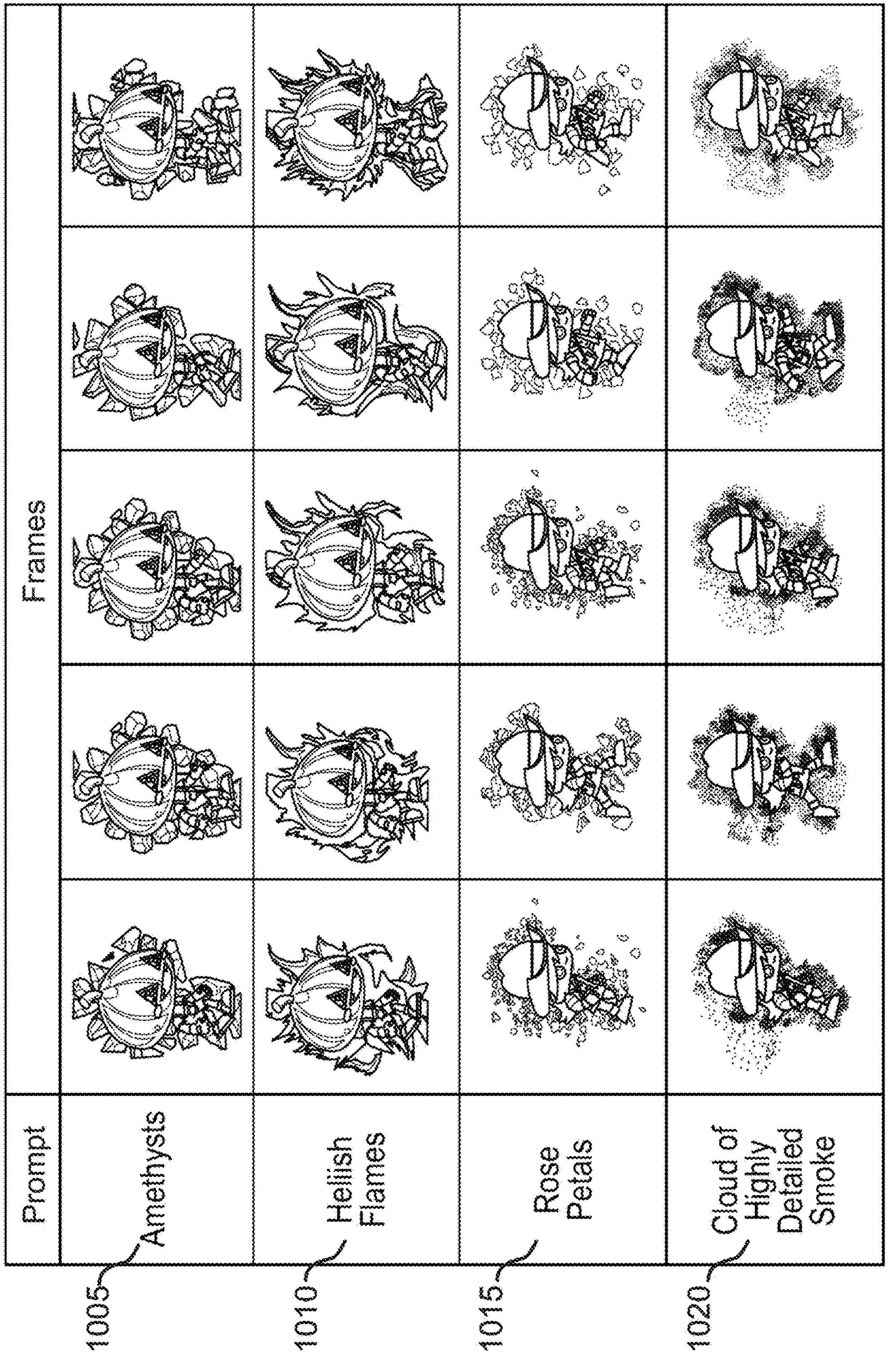
FIG. 10 shows examples of generated assets and effects according to aspects of the present disclosure.

FIG. 10 shows examples of generated assets and effects according to aspects of the present disclosure. FIG. 10 showcases the effectiveness of the proposed texture generation method in creating consistent visual effects across multiple frames according to aspects of the present disclosure. The figure showcases four rows of frames, each generated using a different text prompt and corresponding to two distinct assets. The examples 1000 of dynamic visual effect animation include aspects of the corresponding element described with reference to FIGS. 1-6, 8, and 11.

Row 1005 showcases five frames generated using the prompt "Amethysts." The resulting textures exhibit a consistent appearance of shimmering, translucent purple crystals across all frames. The textures accurately capture the essence of amethysts, with their characteristic color and refractive properties.

Row 1010 showcases five frames generated using the prompt "Hellish Flames." The textures in this row depict intense, fiery patterns with vivid shades of red, orange, and yellow. The consistency of the flame textures across the frames is evident, creating a cohesive and dynamic visual effect.

Rows 1005 and 1010 correspond to the same asset, demonstrating the versatility of the texture generation method in creating diverse textures for a single object. The contrast between the cool, crystalline amethyst textures and the intense, fiery flame textures highlights the range of visual effects that can be achieved.

Row 1015 showcases five frames generated using the prompt "Rose Petals." The resulting textures exhibit a delicate, soft appearance with shades of pink and red, reminiscent of rose petals. The consistency of the petal textures across the frames creates a harmonious and visually pleasing effect.

Row 1020 showcases five frames generated using the prompt "Cloud of Highly Detailed Smoke." The textures in this row depict intricate, wispy patterns of smoke with varying densities and shades of gray. The high level of detail and consistency across the frames demonstrates the method's ability to generate complex and realistic textures.

Rows 1015 and 1020 correspond to another asset, showcasing the method's applicability to different objects. The rose petal textures and smoke textures, while distinct in appearance, maintain a consistent visual style across their respective frames.

The results presented in FIG. 10 highlight the key advantages of the proposed texture generation method. Firstly, the method enables the creation of consistent visual effects across multiple frames, ensuring a cohesive appearance throughout an animation or video sequence. Secondly, the use of text prompts allows for intuitive control over the desired texture characteristics, enabling users to easily specify and generate a wide range of textures. Finally, the method's ability to generate high-quality, detailed textures with natural variations and consistency demonstrates its potential for enhancing visual effects in various applications, such as video games, films, and virtual reality experiences.

Figure 11:
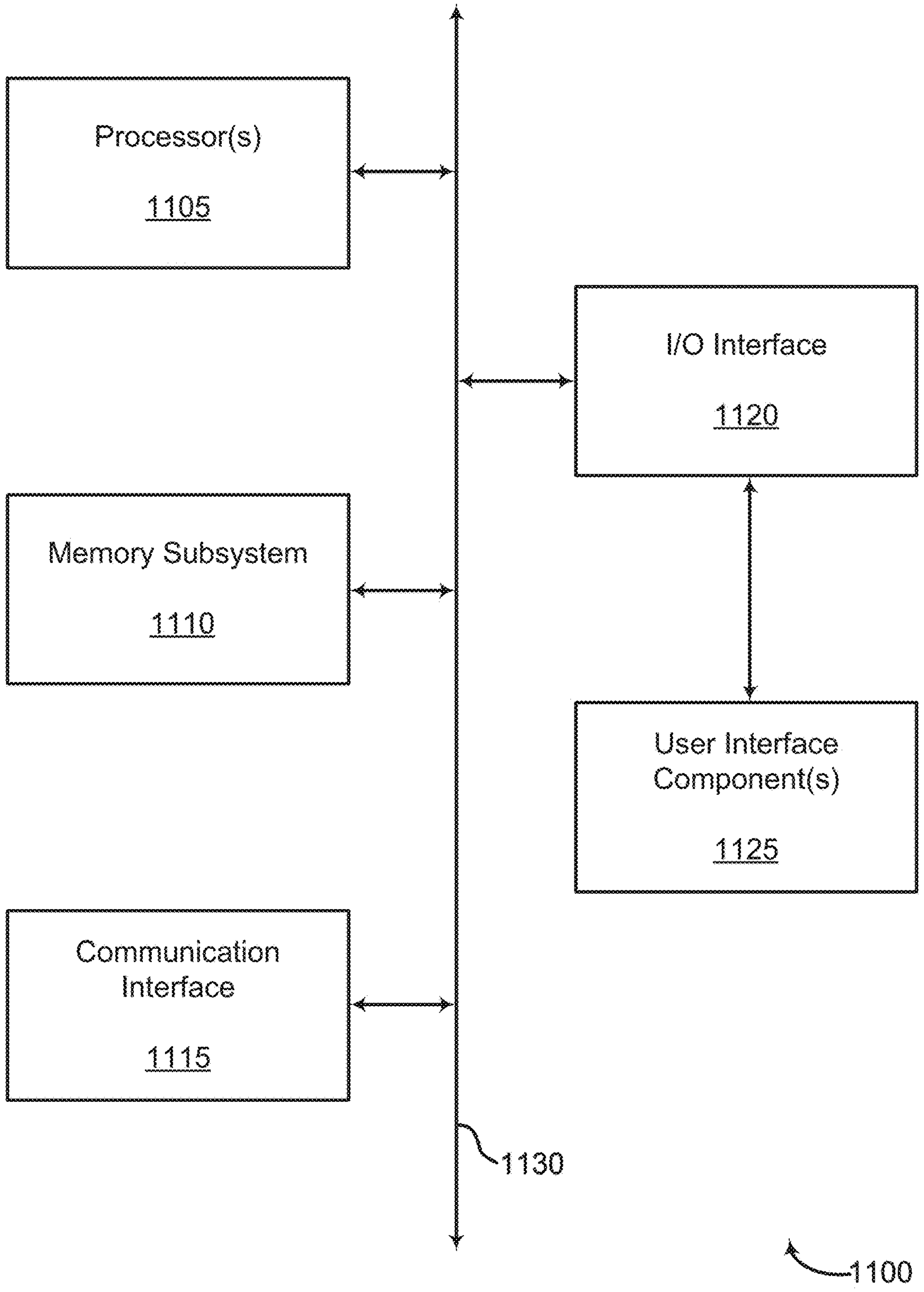
FIG. 11 shows an example of a computing device according to aspects of the present disclosure.

FIG. 11 shows an example of a computing device 1100 according to aspects of the present disclosure. computing device 1100 includes processor(s) 1105, memory subsystem 1110, communication interface 1115, I/O interface 1120, user interface component(s) 1125, and channel 1130. In some embodiments, computing device 1100 is an example of, or includes aspects of, the image generation apparatus described with reference to FIGS. 1 and 6.

In some embodiments, computing device 1100 includes one or more processors 1105 that can execute instructions stored in memory subsystem 1110 to generate synthetic images comprising a first attribute and a second attribute by providing a first attribute token to a first set layers of the image generation model during a first set of time-steps and providing a second attribute token to a second set of layers of the image generation model during a second set of time-steps According to some aspects, computing device 1100 includes one or more processors 1105. Processor(s) 1105 are an example of, or includes aspects of, the processor unit as described with reference to FIG. 5. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof.

In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing.

According to some aspects, memory subsystem 1110 includes one or more memory devices. Memory subsystem 1110 is an example of, or includes aspects of, the memory unit as described with reference to FIG. 5. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1115 operates at a boundary between communicating entities (such as computing device 1100, one or more user devices, a cloud, and one or more databases) and channel 1130 and can record and process communications. In some cases, communication interface 1115 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1120 is controlled by an I/O controller to manage input and output signals for computing device 1100. In some cases, I/O interface 1120 manages peripherals not integrated into computing device 1100. In some cases, I/O interface 1120 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1120 or via hardware components controlled by the I/O controller.

According to some aspects, user interface component 1125 enables a user to interact with computing device 1100. In some cases, user interface component 1125 includes an audio device, such as an external speaker system, an external display device such as a display screen, an input device (e.g., a remote-control device interfaced with a user interface directly or through the I/O controller), or a combination thereof. In some cases, user interface component 1125 includes a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining an input texture image, a plurality of input images, and a plurality of image masks, wherein the input texture image depicts a texture, each of the plurality of input images depicts a same image element at a different location, and each of the plurality of image masks indicates the location of the image element in a corresponding input image;

generating, using an image generation model, a plurality of image assets corresponding to the plurality of input images based on the input texture image and the plurality of image masks, wherein each of the plurality of image assets depicts the texture from the input texture image in a border region of the image element; and generating a combined asset including the plurality of image assets, wherein the combined asset comprises a texture effect video depicting an animation including the texture from the input texture image in the border region adjacent to the image element.

2. The method of claim 1, further comprising:

combining the input texture image with each of the plurality of image masks to obtain a plurality of intermediate texture images, wherein each of the plurality of image assets is generated based on a corresponding intermediate texture image of the plurality of intermediate texture images.

3. The method of claim 2, wherein obtaining the plurality of intermediate texture images comprises:

identifying a plurality of superpixels in the input texture image, wherein each of the plurality of intermediate texture images include a different subset of the plurality of superpixels based on a corresponding mask of the plurality of image masks.

4. The method of claim 1, where obtaining the texture image comprises:

obtaining a text prompt; and generating the texture image based on the text prompt.

5. The method of claim 1, wherein obtaining the plurality of image masks comprises:

generating the plurality of image masks based on the plurality of input images, respectively.

6. The method of claim 1, further comprising:

obtaining a plurality of frames of a video, wherein the plurality of image masks corresponds to the plurality of frames, respectively; and wherein generating the combined asset includes combining the plurality of image assets and the plurality of frames of the video, respectively, wherein the plurality of image assets are temporally consistent based on the plurality of frames of the video, and wherein the combined asset comprises a texture effect video.

7. The method of claim 1, further comprising:

obtaining a plurality of glyph images, wherein the plurality of image masks corresponds to the plurality of glyph images, respectively; and combining the plurality of image assets and the plurality of glyph images to obtain a combined glyph image.

8. The method of claim 1, wherein generating the plurality of image assets comprises:

obtaining a plurality of random seeds, wherein each of the plurality of image assets corresponds to a different random seed from the plurality of random seeds.

9. A method comprising:

obtaining an input texture image, a plurality of glyph images, and a plurality of image masks, wherein the input texture image depicts a texture, each of the plurality of glyph images depicts a different text character, and each of the plurality of image masks indicates a shape of the text character in a corresponding glyph image;

generating, using an image generation model, a plurality of image assets corresponding to the plurality of glyph images based on the input texture image and the plurality of image masks, wherein each of the plurality of image assets depicts the texture from the input texture image in a border region of the text character; and generating a combined asset including the plurality of image assets, wherein the combined asset comprises text including the texture from the input texture image in the border region adjacent to the different text characters from the plurality of glyph images.

10. The method of claim 9, further comprising:

identifying the border region by identifying a plurality of superpixels of the input texture image that overlap pixels of the image mask, wherein the portion of the border region is based on the plurality of superpixels.

11. The method of claim 9, further comprising:

generating an expanded image mask based on the image mask, wherein the border region is based on the image mask.

12. The method of claim 9, further comprising:

obtaining a plurality of frames of a video;

generating a plurality of image masks based on the plurality of frames, respectively; and combining a plurality of image assets and the plurality of frames of the video, respectively, to obtain a texture effect video, wherein the plurality of image assets are temporally consistent based on the plurality of frames of the video.

13. The method of claim 9, further comprising:

generating a plurality of image masks based on the plurality of glyph images, respectively; and combining a plurality of image assets and the plurality of glyph images to obtain a combined glyph image.

14. A system comprising:

a memory component; and a processing device coupled to the memory component, the processing device configured to perform operations comprising:

obtaining an input texture image, a plurality of input images, and a plurality of image masks, wherein the input texture image depicts a texture, each of the plurality of input images depicts a same image element at a different location, and each of the plurality of image masks indicates the location of the image element in a corresponding input image;

generating, using an image generation model, a plurality of image assets corresponding to the plurality of input images based on the input texture image and the plurality of image masks, wherein each of the plurality of image assets depicts the texture from the input texture image in a border region of the image element; and generating a combined asset including the plurality of image assets, wherein the combined asset comprises a texture effect video depicting an animation including the texture from the input texture image in the border region adjacent to the image element.

15. The system of claim 14, wherein:

the image generation model is trained to generate the input texture image based on a text prompt.

16. The system of claim 14, further comprising:

an intermediate texture component configured to combine the input texture image with each of the plurality of image masks to obtain a plurality of intermediate texture images.

17. The system of claim 14, further comprising:

a superpixel component configured to identify a plurality of superpixels in the input texture image, wherein each of a plurality of intermediate texture images include a different subset of the plurality of superpixels.

18. The system of claim 14, further comprising:

a mask extraction component configured to generate the plurality of image masks based on a plurality of input images, respectively, wherein each of the plurality of image masks indicates a location of an element from a corresponding input image from the plurality of input images.

19. The system of claim 14, further comprising:

an animation component configured to combine the plurality of image assets to obtain a texture effect video, wherein the plurality of image assets are temporally consistent based on the plurality of frames of the video.

20. The system of claim 14, wherein:

the image generation model comprises a diffusion model.

* * * * *